United States Patent
Carr et al.

(10) Patent No.: US 6,531,872 B1
(45) Date of Patent: Mar. 11, 2003

(54) IGNITION-OFF TIMER DIAGNOSTIC

(75) Inventors: Mark D. Carr, Fenton, MI (US); Daniel P. Grenn, Highland, MI (US)

(73) Assignee: General Motors Corporation, Detroit, MI (US)

( * ) Notice: Subject to any disclaimer, the term of this patent is extended or adjusted under 35 U.S.C. 154(b) by 129 days.

(21) Appl. No.: 09/676,797

(22) Filed: Sep. 29, 2000

(51) Int. Cl.⁷ ............................................. G01M 15/00
(52) U.S. Cl. ...................................... 324/379; 324/380
(58) Field of Search ................................ 324/380, 391, 324/378, 601, 379; 123/146.5 A, 406.12, 406.11; 701/110

(56) References Cited

U.S. PATENT DOCUMENTS 3,839,907 A * 10/1974 Hanson et al. ................ 73/116
5,387,870 A * 2/1995 Knapp et al. ................ 324/378
5,400,760 A * 3/1995 Miyata et al. ............... 123/630
6,347,276 B1 * 2/2002 Avery, Jr. .................... 701/112

* cited by examiner

Primary Examiner—Christine Oda
Assistant Examiner—Vincent Q. Nguyen
(74) Attorney, Agent, or Firm—Christopher DeVries

(57) ABSTRACT

A method and an apparatus for diagnosing the Ignition-Off Timer of an internal combustion engine. This invention monitors the initial operation of the Ignition-Off Timer each time it is enabled in order to detect a variety of malfunctions. The malfunctions are detected by comparing the operation of the Ignition-Off Timer to various reference values. Upon diagnosis of the Ignition-Off Timer, its condition is reported to the diagnostic management system, which determines whether and when a malfunction indicator is energized.

15 Claims, 2 Drawing Sheets

IGNITION-OFF TIMER DIAGNOSTIC

BACKGROUND OF THE INVENTION

1. Field of the Invention:

The present invention relates, in general, to emission-related diagnostics and/or control algorithms in a power train control module and, specifically, to the diagnosis of malfunctions of the Ignition-Off Timer.

2. Description of the Art:

Ignition-off time is the amount of time measured from the point where an "off" condition of the ignition of an internal combustion engine is detected to the point where an "on" condition is detected, called an ignition-off event. The Ignition-Off Timer function measures, saves and reports the timed duration of the last ignition-off event to the engine controller. The Timer begins functioning when an "off" condition is detected. It resets to zero or one second (depending upon the implementation) and starts incrementing until an "on" condition is encountered. Any ignition-off time of less than or equal to one second is reported to the engine controller as one second. If ignition-off time exceeds a specified maximum duration, usually seven days, the Ignition-Off Timer reports the maximum value in the range to the engine controller.

Among other uses, ignition-off time is used by emission-related diagnostics and/or control algorithms. Therefore, diagnosis of the Ignition-Off Timer is required by the California Air Resources Board (CARB) On-Board Diagnostic II (OBD II) requirements. In particular, diagnosis is required under section (a) (1.0) of the CARB regulation 1968. 1, which provides that all vehicles "shall be equipped with a malfunction indicator light (MIL) located on the instrument panel that will automatically inform the vehicle operator in the event of a malfunction of any power train components which can affect emissions and which provide input to or receive output from the on-board computer(s) or of the on-board computer(s) itself." In addition to emission-related uses, ignition-off time is becoming increasingly important for other diagnostics and controls, such as fuel control.

Thus, it is desirable to develop a method and apparatus to determine whether the Ignition-Off Timer is working properly. In particular, the Ignition-Off Timer should be monitored while it is functioning to determine if it resets and increments properly, and malfunctions should be reported.

SUMMARY OF THE INVENTION

The present invention is a method and apparatus for monitoring the function of an Ignition-Off Timer and reporting the presence of any one of the following failure conditions:

1. Timer is stuck in range;
2. Timer has timing error (counts too slow or too fast);
3. Timer decrements instead of increments;
4. Timer outputs random variables; or
5. Timer exceeds expected range after reset.

The Ignition-Off Timer resets and begins incrementing when the ignition of an internal combustion engine is shut off and continues incrementing until the ignition is turned on. Each time the Timer resets and begins incrementing, the present invention tests the first few seconds of the operation of the Timer. Essentially, the output of the Timer is compared against various reference values, some of which are obtained through the use of another timer, external to the Ignition-Off Timer. Whether the Ignition-Off Timer passes or fails is reported to the diagnostic control manager.

Initialization of the variables used in the diagnostic occurs when the ignition is turned on. After initialization, the engine controller begins sampling the Timer at predetermined intervals.

The Timer does not begin incrementing and is not diagnosed until it is enabled. Therefore, after sampling the Timer, the engine controller queries whether the Timer is enabled. If the Timer is not enabled, the Timer is again sampled. The Timer is then re-checked to see if it is enabled. This control loop continues until the Ignition-Off Timer is enabled, as reported to the engine controller. Once the Timer is enabled, the sampled output time from the Ignition-Off Timer is stored as a base value for ignition-off time, and the diagnostic operation begins.

First, the diagnostic of the present invention checks a flag indicating whether a test is required or not. If the test has already been completed since the ignition was turned off, the Timer will not be tested again, and the diagnostic ends. However, if the test was not completed since the ignition was turned off, the diagnostic proceeds to sample the Timer.

The diagnostic next checks whether the sampled ignition-off time is within a predetermined range of expected values. If the sampled time is outside the predetermined range, the Timer has failed the diagnostic. The failure is reported to the diagnostic control manager, and the flag is set indicating that a test of the Timer is no longer required. The diagnostic then ends.

If the sampled time is within its predetermined range, the diagnostic checks whether the Timer has incremented since the last time it was sampled. This is accomplished by comparing the sampled value to the previously stored value of ignition-off time. If the sampled value is less than the stored ignition-off time, the Timer has failed the diagnostic. The failure is reported to the diagnostic control manager, and the flag is set indicating that a test of the Timer is no longer required. The diagnostic then ends.

If the sampled time is equal to the stored ignition-off time, then the Timer has not incremented. The sample counter is incremented by one. Then, the sample counter is compared to a predetermined high limit. If the sample counter is higher than the high limit, then the Timer has failed the diagnostic. The failure is reported to the diagnostic control manager, and the flag is set indicating that a test of the Timer is no longer required. The diagnostic then ends. If, however, the sample counter is less than or equal to its predetermined maximum count, the diagnostic begins again by sampling the Timer, checking if the sampled time is out-of-range, and checking to see if the Timer incremented. This continues until the Timer either fails the diagnostic or increments.

If the sampled time is greater than the stored ignition-off time, the Timer has incremented. The transition counter is incremented by one count to indicate the change in value of the Timer. The value of the transition counter is compared to a threshold value for the transition counter. If the transition counter is not above the threshold value, the sample counter is reset, and the sampled time is stored in place of the previously stored ignition-off time. Then, the diagnostic begins again with sampling the Timer, checking if the sampled time is out-of-range, and checking to see if the Timer incremented. This continues until the Timer fails, or it increments. If the Timer increments, the transition counter is incremented by one count. The transition counter is again compared to the threshold value.

Once the transition counter is greater than the transition threshold, the diagnostic makes two inquiries. First, the diagnostic queries whether the sample counter is within a predetermined acceptable range of values. The second inquiry made is whether the sampled time minus the stored ignition-off time is equal to one increment of the Timer. If the sample counter is outside the predetermined acceptable range of values, or the sampled time minus the stored ignition-off time is not one increment of the Timer, then the Timer has failed the diagnostic. Then, the sample counter is reset. The sampled time is stored in place of the previously stored ignition-off time. The failure is reported to the diagnostic control manager, and the flag is set indicating that a test of the Timer is no longer required. The diagnostic then ends.

If, however, the sample counter is inside its predetermined acceptable range of values, and the sampled time minus the stored ignition-off time is equal to one increment of the Timer, the Timer has passed the diagnostic. This pass is reported to the diagnostic control manager, and the flag is set indicating that a test of the Timer is no longer required. The diagnostic then ends.

The apparatus of the present invention diagnoses the Ignition-Off Timer. The apparatus includes means for sampling the Ignition-Off Timer at the specified sampling intervals, means for comparing the sampled output time to various references, and means for reporting whether the ignition-off timer is malfunctioning or not based on the results of the comparison.

The method and apparatus of the present invention provide a novel approach for diagnosing malfunctions of the Ignition-Off Timer. Prior to the present invention, the Ignition-Off Timer was undiagnosed. In addition to the CARB regulation requiring the diagnosis of the Timer, the increased importance of ignition-off time in the operation of internal combustion engines makes the present invention a desirable addition to the on-board diagnostics of an automobile.

BRIEF DESCRIPTION OF THE DRAWINGS

The various features, advantages, and other uses of the present invention will become more apparent by referring to the following detailed description and drawing in which.

DETAILED DESCRIPTION

Figure 1:
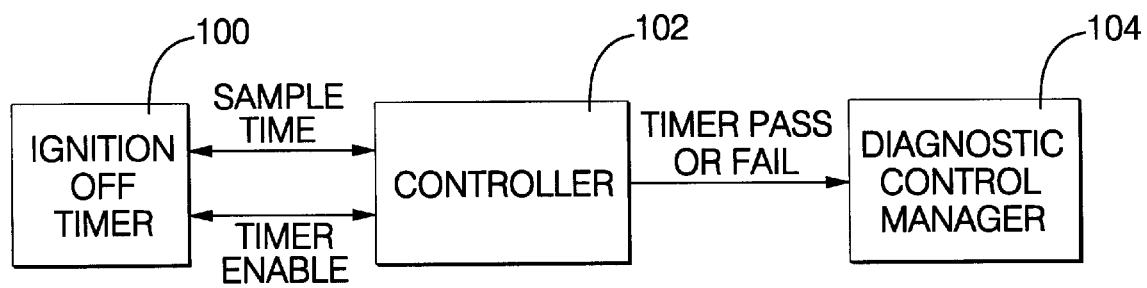
FIG. 1 is a data flow diagram of engine control components involved in carrying out the method of the present invention.

Referring to FIG. 1, an Ignition-Off Timer 100 (hereinafter Timer 100) provides an ignition-off time and a signal as to whether it is enabled or not to an engine controller 102 upon query by the controller 102. The controller 102 receives and analyzes the signals to determine whether the Timer 100 is malfunctioning or not through comparison of the output of the Timer 100 to various references, some of which are obtained through the use of another timer, preferably the software clock of the controller 102. The result of this diagnostic is sent to the diagnostic control manager 104. The diagnostic control manager 104 determines whether and when to generate a malfunction indicator, such as illuminating a malfunction indicator light (not shown).

In a preferred aspect, the Ignition-Off Timer 100 is a hardware timer that resets to zero or one second and increments in one second intervals to a maximum value of seven days. The resulting value is reported to the controller 102 upon request of the controller 102, occurring either: (1) when the Timer 100 is incrementing; or (2) when the ignition is turned on, and the Timer 100 has stopped incrementing. The engine controller 102 receives the output signals from the Timer 100 and analyzes them to determine the status of the Timer 100. The controller 102 may be a conventional microcontroller which includes such elements as a central processing unit (CPU), read only memory, random access memory, input/output control circuitry, and analog to digital conversion circuitry. The controller 102 is activated upon application of ignition power to an engine. When activated, the controller 102 carries out a series of operations stored in an instruction-by-instruction format in memory for providing engine control, diagnostic and maintenance operations.

Generally, this procedure provides for diagnosis of the Ignition-Off Timer 100. More specifically, such a diagnostic is initiated at step 10 in FIG. 2 upon application of ignition power to a previously inactive controller 102 and proceeds to general initialization operations in step 12. Such initialization operations include setting pointers, flags, registers and RAM variables to their starting values. For example, a transition counter and a sample counter used in the diagnostic are set to zero, and a flag is set to indicate that a test of the Timer is required. These starting values could be predetermined or learned and stored from previous operating events such that they can be used for the next event without having to relearn from a pre-established baseline.

Following general initialization operations, the Ignition-Off Timer is sampled in step 14. Then, step 16 inquires into the status of the Timer to determine whether it is enabled. The Timer is enabled and begins functioning when the vehicle is shut off. If the Timer is not enabled, it continues to be sampled at predetermined intervals by returning to step 14. The frequency of sampling is determined based upon the desired and/or expected accuracy of the Timer. As an example, if the Timer increments in one second intervals, a preferred sampling rate would be every 100 ms. Preferably, the sampling is controlled by a signal generated from a software clock of the controller 102. The diagnostic does not proceed until the response to step 16 is that the Timer is enabled. If the Timer is enabled, the diagnostic proceeds to step 18 where Ignition-Off Time Old is set equal to the time sampled in step 14. Then, the diagnostic proceeds to step 19, which indicates a transition between FIG. 2 and FIG. 3 for the block diagram of the inventive method.

Figure 2:
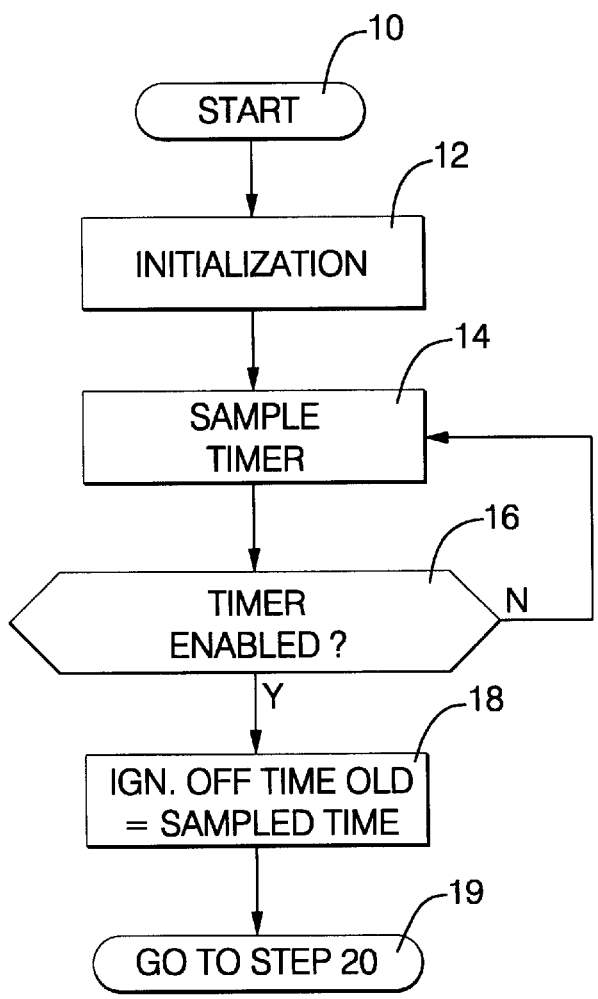
FIG. 2 is a block diagram illustrating a first portion of the method according to the present invention.
Figure 3:
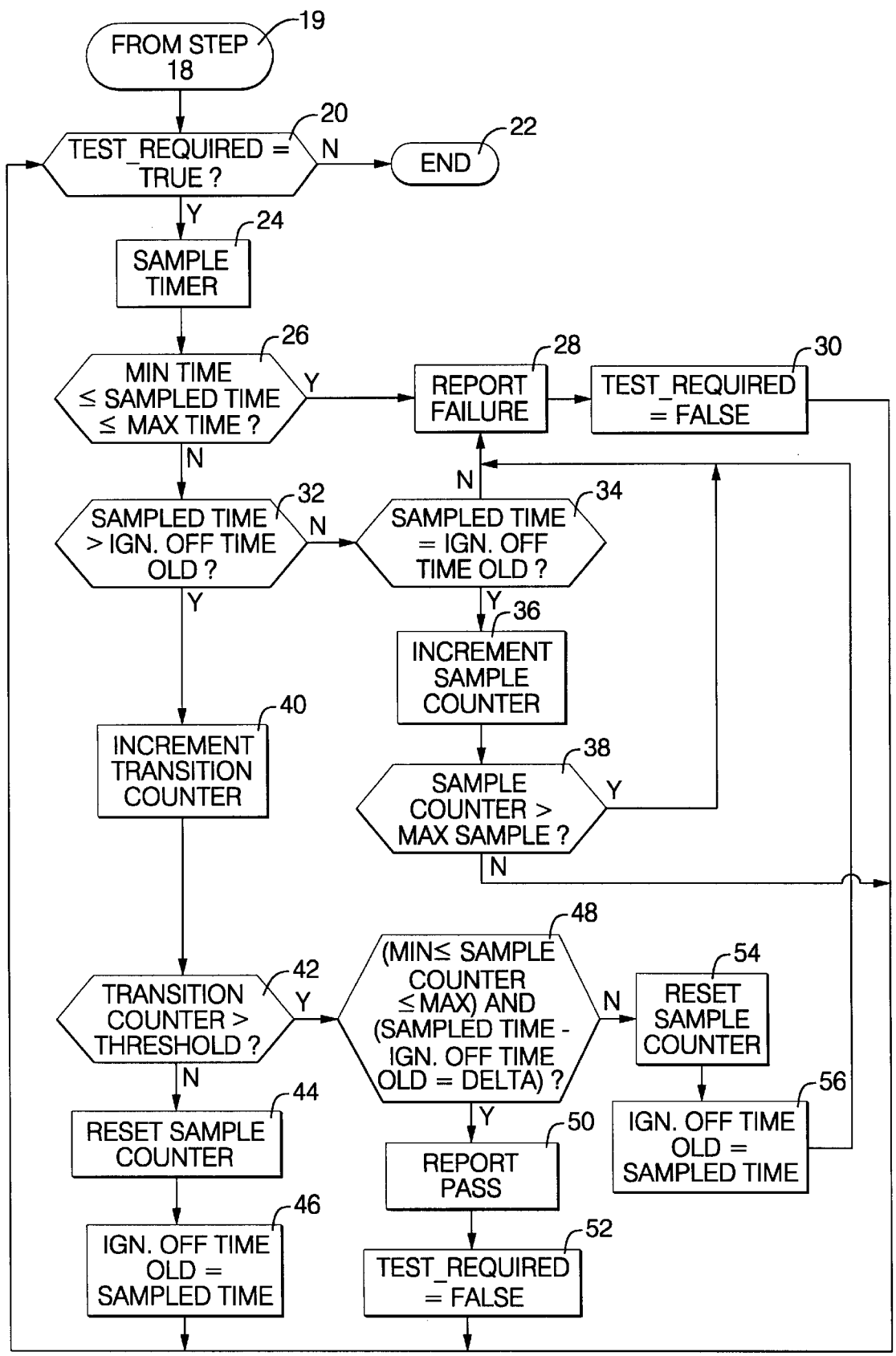
FIG. 3 is a block diagram illustrating a second portion of the method according to the present invention.

Referring now to FIG. 3, step 19 from FIG. 2 is repeated to indicate a continuation of the block diagram of FIG. 2. In the next step 20, the diagnostic checks to see whether it has been completed since the last shut off by querying whether the Test_Required flag is TRUE. If the Test_Required flag is FALSE, then the diagnostic ends at step 22. If the diagnostic has not been completed, the Test_Required flag is TRUE, and the Timer is sampled in step 24.

In step 26, this sampled ignition-off time is compared to a predetermined acceptable range of values for ignition-off time. This range would be set based on the operational characteristics of the Timer. By example, if the Timer resets to 1, and increments in one second intervals, the diagnostic should be completed before 5 seconds have passed. Therefore, the range of acceptable values for the sampled time would be from one to five seconds. If the sampled ignition-off time is lower than the low limit or higher than the high limit, then a failure condition is indicated. This would occur, for example, if the Timer reset out of range. In step 28, the failure is reported. The flag Test_Required is set to FALSE in step 30. The diagnostic then returns to step 20.

Returning to step 26, if the ignition-off time is within the acceptable range of values, the sampled ignition-off time is compared to the stored Ignition-Off Time Old in step 32. If the sampled ignition-off time is less than or equal to Ignition-Off Time Old, then the diagnostic proceeds to inquire in step 34 whether the sampled time is equal to Ignition-Off Time Old. If the answer in step 34 is no, then the sampled ignition-off time is less than the stored Ignition-Off Time Old. Because this would indicate that the Timer is decrementing instead of incrementing, a failure is reported in step 28. The diagnostic proceeds to step 30, where Test_Required is set to FALSE, and the diagnostic returns to step 20.

Returning to step 34, if the sampled time is equal to Ignition-Off Time Old, then the sample counter is incremented by one count in step 36. In the next step 38, the sample counter is compared to a predetermined high limit for the counter. The high limit for the sample counter represents the maximum number of samples that should be read before the Timer changes its value. By example, if the Timer increments in one second intervals, it resets to 1, and the sampling interval is 100 ms, then a change in the value of the Timer to 2 seconds should occur in a maximum of ten intervals, depending upon where the initial sample occurred. The high limit for the sample counter could be set to 10. However, due to the inherent variability of clocks, the Timer may not change exactly in 10 sampling intervals. Preferably, the high limit for the sample counter would reflect this variability. In this example, the high limit could be set at, for example, 11 intervals. As another example, if the Timer increments in one second intervals, it resets to 0, and the sampling interval is 100 ms, then a change in the value of the Timer from one to two seconds should occur in a maximum of 20 intervals (times less than one second are reported by the Timer as one second in this example). Therefore, the high limit for the sample counter would be, for example, 21 intervals.

If the counter is equal to or below the high limit, the diagnostic returns to step 20. If, however, the sample counter is greater than its predetermined high limit, then a failure is reported in step 28. The sample counter would be greater than its high limit if, for example, the Timer was stuck and not incrementing. After the failure is reported in step 28, the Test_Required flag is set to FALSE in step 30. Then, the diagnostic returns to step 20.

Returning to step 32, if the sampled ignition-off time is greater than the stored Ignition-Off Time Old, a transition counter is incremented by one count in step 40. After the transition counter is incremented in step 40, it is compared to threshold value in step 42. The threshold value is a minimum number of changes in the value of the Timer required before the diagnostic proceeds further. The threshold assures that the number of samples occurring before a change in the Timer is in a predictable range before the test proceeds. If the transition counter is less than or equal to the threshold value, the sample counter is reset in step 44. Then, in step 46, Ignition-Off Time Old is set equal to the sampled ignition-off time, replacing the previous value of Ignition-Off Time Old. The diagnostic then returns to step 20.

Returning to step 42, if the transition counter is higher than the threshold value, the diagnostic proceeds to step 48. In most aspects of the present invention, the transition threshold would be 1. Therefore, the second time the transition counter incremented, the diagnostic could proceed.

In step 48, two inquiries are made. The first is whether the sample counter is within a predetermined acceptable range of values. The range of values for the sample counter is based on the sampling interval and the desired and/or expected accuracy of the Timer. For example, if the sampling interval is 100 ms where the Timer increments in one second intervals, then the Timer should increment every 10 samples. As previously discussed, however, due to the inherent variability of clocks, the Timer may not change exactly in 10 sampling intervals. Therefore, a range is chosen reflecting a maximum acceptable variation from this standard, as measured against the PCM software timer. In this example, if accuracy of diagnosing the Timer is desired within 10% of the PCM software timer, the range of acceptable values for the sample counter would be 9 to 11 intervals. If accuracy of the Timer is desired within 20% of the PCM software timer, the range of acceptable values for the sample counter would be 8 to 12 intervals. As a further example, if greater accuracy is required, the sampling interval and the range of values for the sample counter could both be adjusted. If the sampling interval is increased to 10 ms intervals, the Timer should increment every 100 samples. An acceptable range of values for the sample counter of 99 to 101 intervals would result in an accuracy of the Timer within 1% of the PCM software timer.

The second inquiry in step 48 is whether the sampled time minus Ignition-Off Time Old is equal to one increment of the Timer. By example, if the Timer is incrementing in one second intervals, the sampled time minus the stored ignition-off time should be equal to one second.

In step 48, if the sample counter is within a predetermined acceptable range of values and the sampled time minus Ignition-Off Time Old is equal to one increment of the Timer, then the Timer has passed the test and is reported as passed in step 50. The Test_Required flag is set to FALSE in step 52. Then, the diagnostic begins again at step 20.

Returning to step 48, if the sample counter is outside its predetermined acceptable range of values or the sampled time minus Ignition-Off Time Old is not equal to one increment of the Timer, then the Timer failed the diagnostic. The sample counter would be outside an acceptable range of values if, for example, the Timer has a timing error, that is, it counts too slow or too fast. The difference between sampled time and Ignition-Off Time Old would vary from one increment of the Timer if, for example, the Timer is outputting random numbers. The diagnostic proceeds to reset the sample counter in step 54, and set Ignition-Off Time Old to the sampled time in step 56. Then, the failure is reported in step 28. After the failure is reported in step 28, the flag Test_Required is set to FALSE in step 30, and the diagnostic returns to step 20.

What is claimed is:

1. A method of diagnosing an ignition-off timer in a vehicle, comprising the steps of:
    sampling an output time of the ignition-off timer at predetermined sampling intervals;
    comparing the sampled output time to a reference; and
    reporting whether the ignition-off timer is malfunctioning based on the results of the comparing step.

2. The method of claim 1 wherein the comparing step comprises the steps of:
    incrementing a sample count of a sample counter when the sampled output time does not change from the sampled output time in a prior sampling interval;
    comparing the sample count to maximum and minimum values;
    subtracting the sampled output time from a prior sampling interval from the sampled output time to generate a difference value;

comparing the difference value to a reference value; and reporting an ignition-off test pass if the sample count is one of greater than and equal to the minimum value and one of less than and equal to the maximum value and the difference value is equal to the reference value.

3. The method of claim 1 wherein the comparing step comprises the step of:

incrementing a sample count of a sample counter when the sampled output time does not change from the sampled output time in a prior sampling interval;

comparing the sample counter to a predetermined maximum value; and reporting an ignition-off timer fault if the sample counter exceeds the predetermined maximum value.

4. The method of claim 1 wherein the comparing step comprises the step of:

comparing the sampled output time to maximum and minimum values; and reporting an ignition-off timer fault if the sampled output time is one of less that the minimum value and greater than the maximum value.

5. The method of claim 1 wherein the comparing step comprises the step of:

comparing the sampled output time to the sampled output time in a prior sampling interval to determine whether the ignition-off timer is not incrementing or decrementing; and reporting an ignition-off timer fault if said ignition-off timer is not incrementing or decrementing.

6. A method of diagnosing an ignition-off timer in a vehicle, comprising the steps of:

sampling an output time of the ignition-off timer at predetermined sampling intervals;

performing at least one of the following comparison steps:

A) incrementing a sample count of a sample counter when the sampled output time does not change from the sampled output time in a prior sampling interval;

comparing the sample count to maximum and minimum values;

subtracting the sampled output time from a prior sampling interval from the sampled output time to generate a difference value;

comparing the difference value to a reference value; and identifying an ignition-off test pass if the sample count is one of greater than and equal to the minimum value and one of less than and equal to the maximum value and the difference value is equal to the reference value;

B) incrementing a sample count of a sample counter when the sampled output time does not change from the sampled output time in a prior sampling interval;

comparing the sample counter to a predetermined maximum value; and identifying an ignition-off timer fault if the sample counter exceeds the predetermined maximum value;

C) comparing the sampled output time to maximum and minimum values; and identifying an ignition-off timer fault if the sampled output time is one of less that the minimum value and greater than the maximum value; and D) comparing the sampled output time to the sampled output time in a prior sampling interval to determine whether the ignition-off timer is not incrementing or decrementing; and identifying an ignition-off timer fault if said ignition-off timer is not incrementing or decrementing;

E) subtracting the sampled output time in the prior sampling interval from the sampled output time; and comparing the result from the subtracting step to a reference value; and reporting whether the ignition-off timer is malfunctioning based on the results of the comparing step.

7. The method of claim 6, further comprising the step of:

comparing the sample count to a predetermined maximum value when the sampled output time does not change from the sampled output time in a prior sampling interval.

8. The method of claim 7, further comprising the step of:

comparing the sampled output time to maximum and minimum values.

9. The method of claim 8, further comprising the step of:

comparing the sampled output time to the sampled output time in a prior sampling interval to determine whether the ignition-off timer is incrementing or decrementing.

10. The method of claim 8, further comprising the steps of:

subtracting the sampled output time in the prior sampling interval from the sampled output time to generate a difference value; and comparing the difference value to a reference value.

11. An apparatus for diagnosing malfunctions of an ignition-off timer in a vehicle, comprising:

means for sampling the output time of the ignition-off timer at predetermined sampling intervals;

means for comparing the sampled output time to a reference; and means for reporting whether the ignition-off timer is malfunctioning based on the results of the comparing step.

12. The apparatus of claim 11 wherein the comparing means comprises:

means for incrementing a sample count of a sample counter when the sampled output time does not change from the sampled output time in a prior sampling interval;

means for comparing the sample count to a predetermined range of values;

means for subtracting the sampled output time from a prior sampling interval from the sampled output time to generate a difference value;

means for comparing the difference value to a reference value; and means for reporting an ignition-off test pass if the sample count is one of greater than and equal to the minimum value and one of less than and equal to the maximum value and the difference value is equal to the reference value.

13. The apparatus of claim 11 wherein the comparing means comprises:

means for incrementing a sample count of a sample counter when the sampled output time does not change from the sampled output time in a prior sampling interval;

means for comparing the sample counter to a predetermined maximum value; and means for reporting an ignition-off timer fault if the sample counter exceeds the predetermined maximum value.

14. The apparatus of claim 11 wherein the comparing means comprises:
- means for comparing the sampled output time to maximum and minimum values; and
- means for reporting an ignition-off timer fault if the sampled output time is one of less that the minimum value and greater than the maximum value.

15. The apparatus of claim 11 wherein the comparing means comprises:
- means for comparing the sampled output time to the sampled output time in a prior sampling interval to determine whether the ignition-off timer is not incrementing or decrementing; and
- means for reporting an ignition-off timer fault if said ignition-off timer is not incrementing or decrementing.

* * * * *